Feb. 23, 1943.   O. D. PREMO   2,312,052
SHOCK ABSORBER
Filed April 29, 1941   3 Sheets-Sheet 1

Owen D. Premo
INVENTOR.
BY

Feb. 23, 1943.   O. D. PREMO   2,312,052
SHOCK ABSORBER
Filed April 29, 1941   3 Sheets-Sheet 2
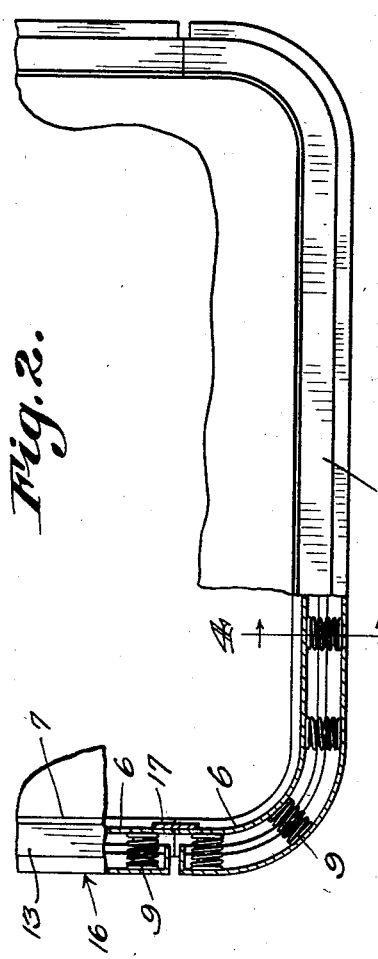
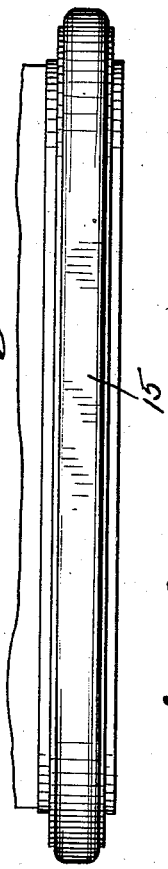
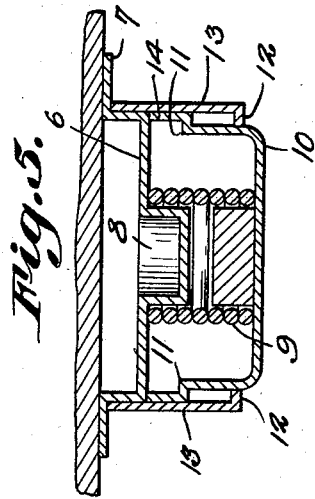
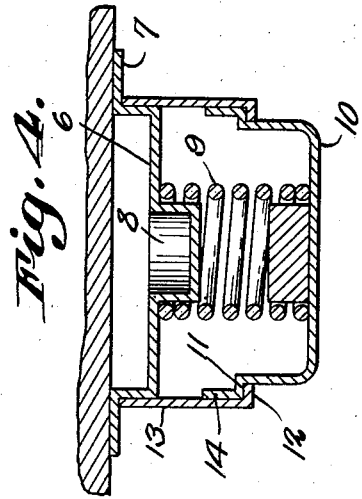
Owen D. Premo
INVENTOR.
BY Feb. 23, 1943.   O. D. PREMO   2,312,052
SHOCK ABSORBER
Filed April 29, 1941   3 Sheets-Sheet 3
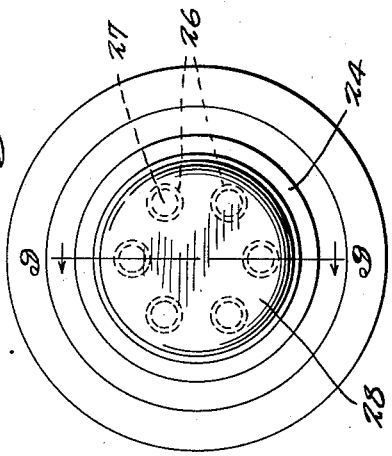
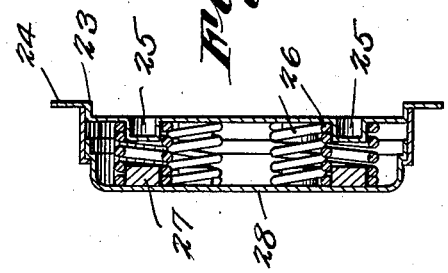
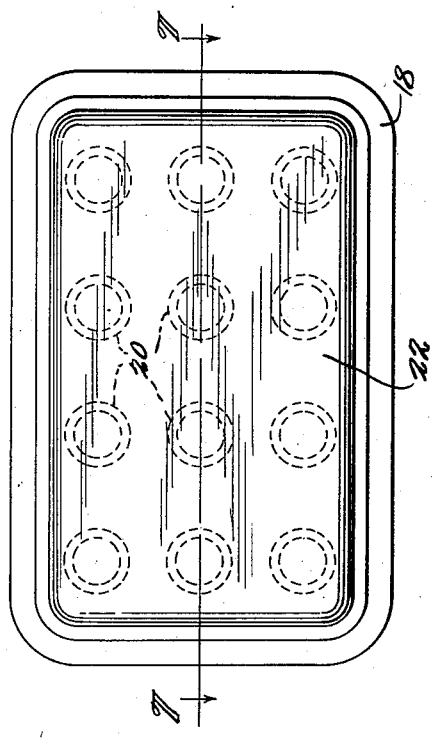
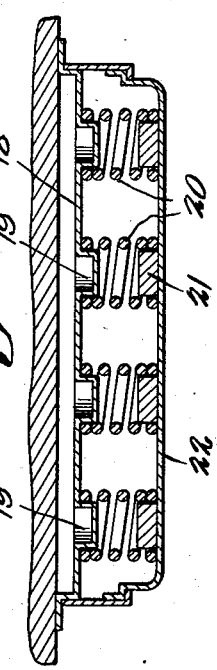
Owen D. Premo
INVENTOR.

Patented Feb. 23, 1943

2,312,052

UNITED STATES PATENT OFFICE 2,312,052

SHOCK ABSORBER

Owen D. Premo, Muskegon Heights, Mich.

Application April 29, 1941, Serial No. 390,992

1 Claim. (Cl. 293—57)

This invention relates to shock absorber construction, the primary object of the invention being to provide a shock absorber especially adapted in the construction of motor vehicle bumpers, hub caps, guard rails or the like, the construction of the device being such that the shock absorber may be mounted at the sides as well as at the front and back of a vehicle, thereby providing a guard that will insure the maximum protection, when a car equipped with the device, is parked in restricted places.

An important object of the invention is to provide a shock absorber wherein the movable member thereof will be guided in its movements within the supporting member, the support and movable member constituting a stop restricting outward movement of the movable member beyond a predetermined point, insuring the true operation of the movable member at all times.

Another important object of the invention is to provide a shock absorber of this character, which will enclose the springs or yieldable members thereof, thereby protecting the movable elements against foreign matter, to insure the true operation of the device, and at the same time materially increase the life of the shock absorber.

Still another object of the invention is to provide a shock absorber which may be used either with straight or curved surfaces, adapting the device for various uses.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 2 is a plan view of the device, a portion of the shock absorber being broken away, illustrating the yieldable support for the outer or movable member of the shock absorber.

Figure 3 is a front elevational view thereof.

Figure 4 is a sectional view taken on line 4—4 of Figure 2.

Figure 5 is a sectional view similar to Figure 4, and illustrating the springs or yieldable members supported within the device, as compressed.

Figure 6 is an elevational view illustrating the principle of the invention as carried out in the construction of a guard.

Figure 7 is a sectional view taken on line 7—7 of Figure 6.

Figure 8 is an elevational view illustrating the features of the invention as built into a hub cap of a motor vehicle wheel.

Figure 9 is a sectional view taken on line 9—9 of Figure 8.

Figure 1:
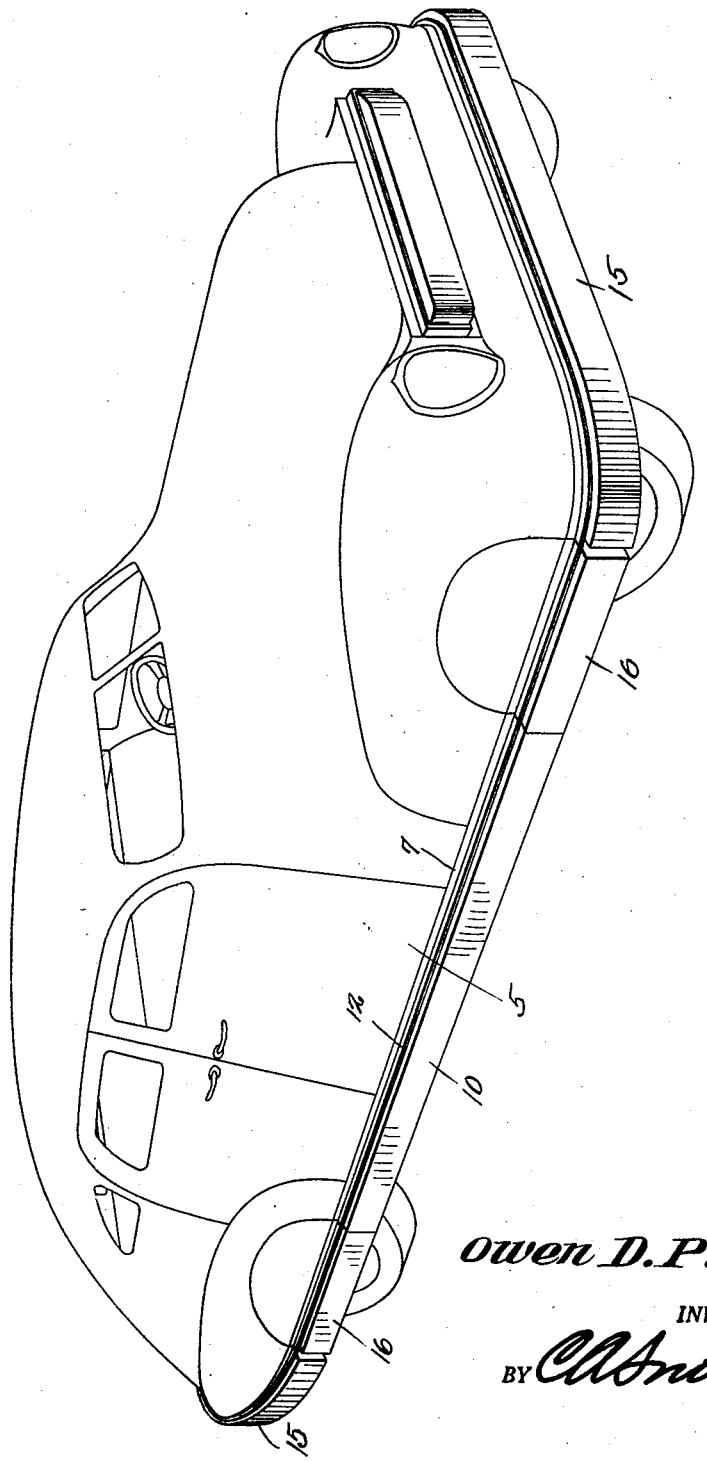
Figure 1 is a perspective view illustrating a motor vehicle, equipped with a shock-absorbing device constructed in accordance with the invention.

Referring to the drawings in detail, in Figure 1 of the drawings I have shown the shock absorber as used in connection with a motor vehicle body. However, it is to be understood that the shock absorber may be used in many places, as for example, on trucks, aeroplanes, guard rails or the like.

In the present showing, the motor vehicle is indicated generally by the reference character 5, and the shock absorber or guard, is shown as extending completely around the body of the vehicle on a line with the front and rear bumpers of the usual motor vehicle.

In the present showing, the reference character 6 designates the base rail of the shock absorber, and as shown, the base rail embodies a channel bar structure having outwardly extended flanges 7 formed along its longitudinal edges which provide surfaces, whereby the base rail may be secured to a supporting surface, such as a motor vehicle body.

These flanges may be secured to a supporting surface, by spot welding, bolts or similar securing means depending on the type of supporting surface, on which the shock absorbing device is mounted.

Enlargements 8 are formed on the base rail, and extend outwardly therefrom, the enlargements being circular to accommodate the inner ends of the coiled springs 9 which are housed by the device, and which act to force the movable section 10 of the shock absorber outwardly, and cushion inward movement thereof.

The movable section is substantially U-shaped in cross-section, and is formed with offset portions 11 providing shoulders to engage the inwardly extended flanges 12, limiting the outward movement of the movable section, and at the same time insuring a close fit between the movable section and the plates 13 which, with the movable section, form a complete housing to exclude foreign matter, from the interior of the device.

As shown, the edges of the movable member, indicated at 14, extend in parallel relation with the plates 13, and are adapted to abut against the outer surface of the base rail 6 associated therewith, when the springs supported within the device are compressed, thereby relieving the springs of undue strain under a severe shock caused by the impact of the movable member 10, against an object.

The plates 13 are secured to the sides of the base rail 6, by spot welding securely uniting the plates 13 and base rail 6.

The front and rear bumper sections of the shock absorber, are indicated by the reference character 15, and these sections are shown as having their ends curved around the adjacent fenders, the extremities of the bumper sections being spaced from the adjacent side sections of the shock absorber, permitting rearward movement of the movable sections, under impact.

In order that the wheels of the vehicle equipped with the shock-absorbing device, may be removed, the side members of the shock absorbing device are formed with removable sections 16 which are held in place by suitable securing members not shown, the removable sections engaging the bars 17 that extend from the base rail 6 of the shock-absorbing device.

In the form of the invention as shown by Figure 6 of the drawings, the principles of the invention, are carried out in the construction of a guard plate to be used at any desired location.

In this form of the invention, the base plate is indicated by the reference character 18, and is preferably rectangular in formation, the base plate having rows of enlargements 19 which are circular in formation, and are of diameters to accommodate the inner ends of the coiled springs 20. The outer ends of the coiled springs being positioned over the circular enlargements 21 that are secured to the inner surface of the outer movable plate 22 that operates in the same manner as the movable sections 10.

As shown by Figures 8 and 9 of the drawings, the shock absorber is used in the construction of a hub cap, to the end that when the hub cap is struck by a moving object, the movable section of the hub cap will be forced inwardly, eliminating any possibility of damage to the hub cap.

As shown, the base 23 is disk-like in formation and is provided with an annular flange 24 to be bolted or otherwise suitably secured to the vehicle wheel. The base is formed with a circular row of enlargements 25 over which the inner ends of the coiled springs 26 are positioned, the outer ends of the coiled springs 26 being held in place by the circular lugs 27 that are secured to the inner surface of the outer movable section 28, forming the outer section of the hub cap.

From the foregoing it will be seen that due to the construction shown and described, I have provided a shock absorber which will guard against damage to the member on which the shock absorber is mounted, should the shock absorber be subjected to a severe jar or blow, caused by the shock absorber being struck by a moving object.

It will further be seen that due to applicant's construction, the yieldable members or springs, are completely housed and protected against the elements, to insure their true operation at all times.

In view of the foregoing disclosure, it is thought that a further detail description as to the operation of the device is unnecessary.

What is claimed is:

A shock absorber for use on vehicles, comprising a body portion adapted to extend around the entire vehicle, and comprising a base rail of channel bar construction, flanges extending laterally from the free edges of the base rail, the open side of the base rail being fitted against the vehicle, the flanges of the base rail being secured to the vehicle, spaced enlargements on the base rail and extending outwardly therefrom, spaced parallel plates secured to the base rail and extending an appreciable distance beyond the base rail, the outer edges of said plates being extended inwardly providing flanges, a movable section comprising a member of channel bar construction, fitted between the spaced plates, the open side of the movable section being disposed inwardly towards the base rail, shoulders formed on the movable member and adapted to engage the flanges of said plates restricting movement of the movable member, enlargements extending inwardly from the movable member and disposed opposite to the enlargements of the base rail, and yieldable members having their ends fitted over the enlargements of the base rail and movable section and adapted to normally urge the movable section outwardly.

OWEN D. PREMO.